US009584738B2

(12) United States Patent
Slaby et al.

(10) Patent No.: US 9,584,738 B2
(45) Date of Patent: Feb. 28, 2017

(54) MULTI-WAVELENGTH INFRA-RED LED

(71) Applicant: Motorola Mobility LLC, Chicago, IL (US)

(72) Inventors: Jiri Slaby, Buffalo Grove, IL (US); Rachid M Alameh, Crystal Lake, IL (US); Lawrence A Willis, Dubuque, IA (US)

(73) Assignee: Motorola Mobility LLC, Chicago, IL (US)

( * ) Notice: Subject to any disclaimer, the term of this patent is extended or adjusted under 35 U.S.C. 154(b) by 36 days.

(21) Appl. No.: 14/716,954

(22) Filed: May 20, 2015

(65) Prior Publication Data

US 2016/0344950 A1    Nov. 24, 2016

(51) Int. Cl.
*H04N 5/33* (2006.01)
*H04W 12/06* (2009.01)
*G06K 9/00* (2006.01)
*G06F 3/01* (2006.01)

(52) U.S. Cl.
CPC .............. *H04N 5/33* (2013.01); *G06F 3/017* (2013.01); *G06K 9/00604* (2013.01); *G06K 9/00617* (2013.01); *H04W 12/06* (2013.01)

(58) Field of Classification Search
None
See application file for complete search history.

(56) References Cited

U.S. PATENT DOCUMENTS

| 8,878,773 | B1* | 11/2014 | Bozarth | G06K 9/00604 345/156 |
| 2005/0133693 | A1* | 6/2005 | Fouquet | G01J 3/10 250/214 R |
| 2009/0174578 | A1* | 7/2009 | Taki | G01B 11/002 341/20 |

* cited by examiner

*Primary Examiner* — Nicholas Lee

(57) ABSTRACT

In embodiments of multi-wavelength infra-red LED, a mobile device includes a multi-wavelength infra-red (IR) LED that projects near infra-red (NIR) light in multiple wavelengths. The multi-wavelength IR LED can be implemented as a single LED, or as a combination of LEDs packaged together as a single component for implementation in the mobile device. The mobile device can be implemented for various IR-based features, such as for iris illumination and authentication, proximity sensing, gesture detection, and for other IR-based features that each correspond to a different one of the multiple wavelengths of the NIR light. The mobile device includes a NIR filtering system to receive reflections of the NIR light and filter the multiple wavelengths of the NIR light for each of the different IR-based features of the mobile device.

20 Claims, 4 Drawing Sheets

MULTI-WAVELENGTH INFRA-RED LED

BACKGROUND

Portable devices, such as mobile phones, tablet devices, digital cameras, and other types of computing and electronic devices are designed with an increasing number of features and options, yet often as smaller and easily-portable devices. Accordingly, advancements in developing device components are needed to provide consumer devices that are portable, smaller, and/or equipped with more features. For example, mobile phones are designed to support more near infra-red (NIR) features for user experiences, such as for iris authentication to authenticate a user of a device, face authentication to authenticate the user of the device, expression recognition, for infra-red (IR) gesture detection with an imager or other receivers, for eye tracking, and for proximity sensing to detect the proximity of a user to the device, as well as for data communication. For each NIR feature or system implemented in a mobile device, an IR light emitting diode (LED) with a different wavelength is needed to provide a dedicated, optimum wavelength of the infra-red light. The multiple LEDs and components for the various NIR features or systems take-up printed circuit board (PCB) and packaging space in the mobile devices, which in some cases limits integration of new technologies into a mobile device, or results in an overall device size larger than acceptable.

BRIEF DESCRIPTION OF THE DRAWINGS

Embodiments of a multi-wavelength infra-red LED are described with reference to the following Figures. The same numbers may be used throughout to reference like features and components that are shown in the Figures.

DETAILED DESCRIPTION

Embodiments of a multi-wavelength infra-red (IR) LED are described, such as for any type of mobile device that may be implemented with an infra-red processing system that includes various IR-based features implemented by the mobile device, such as gesture recognition, iris authentication, and/or proximity sensing of a user of the mobile device. In aspects of a multi-wavelength infra-red LED, a mobile device includes a multi-wavelength IR LED that can be implemented as a single LED, or as a combination of LEDs packaged together as a single component for implementation in the mobile device. The multi-wavelength IR LED is designed to conserve PCB and packaging space in a mobile device, allowing integration of new technologies in mobile devices. The multi-wavelength IR LED projects near infrared (NIR) light in multiple wavelengths, and the various IR-based features each correspond to a different one of the multiple wavelengths of the NIR light. The mobile device also includes a NIR filtering system to receive reflections of the NIR light and filter the NIR light to pass one of the multiple wavelengths for each of the different IR-based features of the mobile device.

In implementations, the multi-wavelength IR LED is designed to project the NIR light in the multiple wavelengths, such as wavelengths that encompass approximately 790 nm to 860 nm (nanometers). For example, the multi-wavelength IR LED can project the NIR light at a wavelength of approximately 810 nm to illuminate an eye (or both eyes) of a person, the NIR light is reflected from the eye or eyes of the person, and the NIR filtering system filters the NIR light to pass the 810 nm wavelength of the NIR light to capture an image of a pupil of the eye with an IR imager for iris authentication. Additionally, the NIR light can be projected at a wavelength of approximately 830 nm that illuminates and is reflected from the person, and the NIR filtering system filters the NIR light to pass the 830 nm wavelength of the NIR light for proximity sensing to detect the proximity of the person to the mobile device. Further, the NIR light can be projected at a wavelength of approximately 850 nm that illuminates and is reflected from the person, and the NIR filtering system filters the NIR light to pass the 850 nm wavelength of the NIR light to detect a gesture from the person as an input to the mobile device. In other implementations, the multi-wavelength IR LED may be designed to project the NIR light in multiple wavelengths that encompass approximately 790 nm to 1400 nm (nanometers), or lower and/or higher.

While features and concepts of a multi-wavelength infra-red LED can be implemented in any number of different devices, systems, environments, and/or configurations, embodiments of a multi-wavelength infra-red LED are described in the context of the following example devices, systems, and methods.

Figure 1:
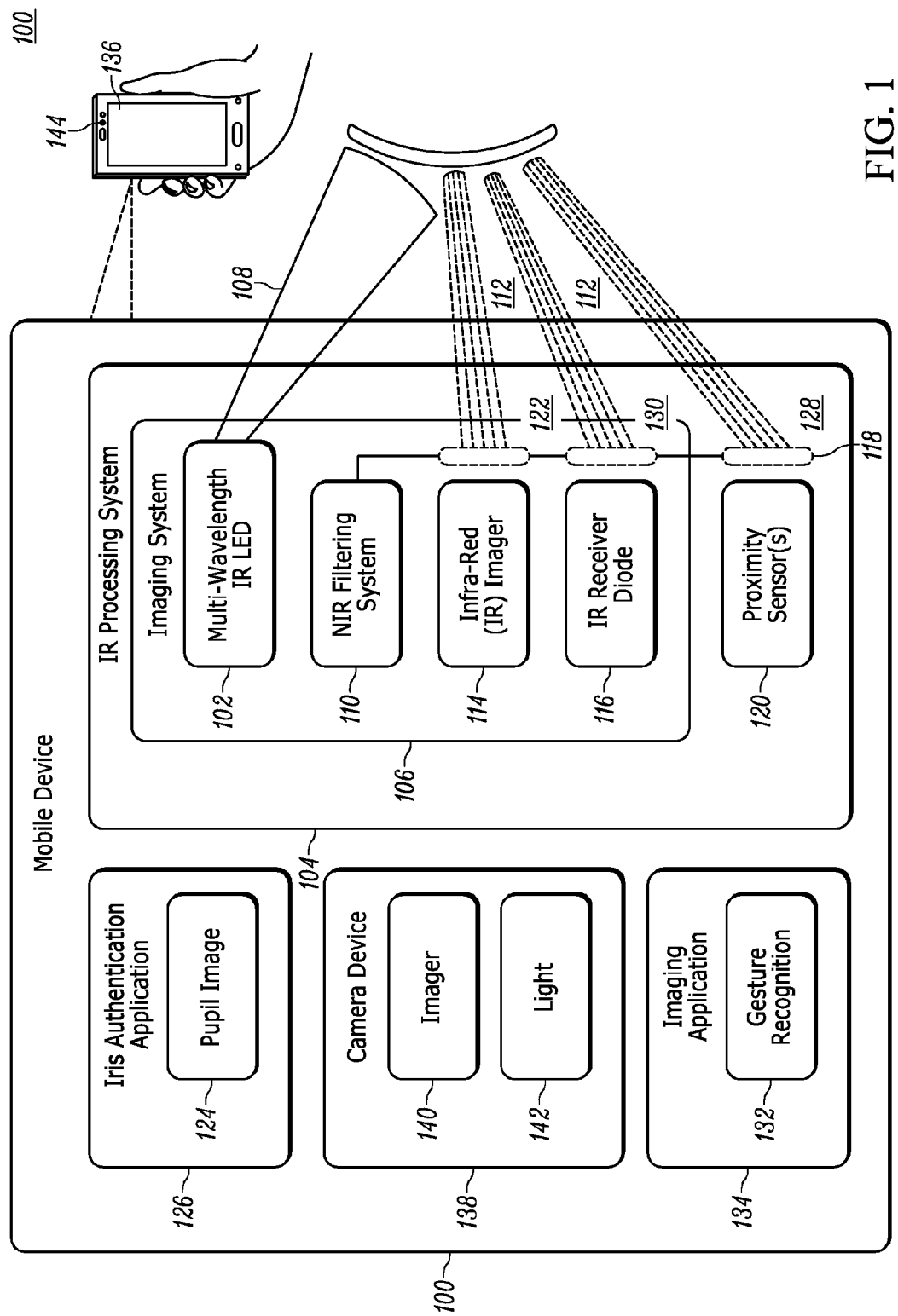
FIG. 1 illustrates an example mobile device in which embodiments of a multi-wavelength infra-red LED can be implemented.

FIG. 1 illustrates an example mobile device 100 in which embodiments of a multi-wavelength infra-red LED 102 can be implemented. The example mobile device 100 may be any type of mobile phone, tablet device, digital camera, or other types of computing and electronic devices that are typically battery powered. In this example, the mobile device 100 implements components and features of an infra-red (IR) processing system 104 that can be utilized for various IR-based features implemented by the mobile device, such as gesture recognition, iris authentication, and/or proximity sensing of a user of the mobile device. The IR processing system 104 includes an imaging system 106 with the multi-wavelength IR LED 102 that is implemented to project near infra-red (NIR) light 108 in multiple wavelengths. The imaging system 106 also includes a NIR filtering system 110 that is implemented to receive reflected NIR light 112 and filter the multiple wavelengths of the NIR light for each of the different IR-based features of the mobile device.

The imaging system 106 of the mobile device 100 also includes an IR imager 114 and an IR receiver diode 116. The NIR filtering system 110 includes passive filters 118 implemented over each IR receiver and IR imager (i.e., over the components that receive the reflected NIR light). A passive filter 118 allows only the reflected light of a pre-determined wavelength to reach the IR receiver diode 116 or IR imager 114, while the other wavelengths are filtered and not allowed to pass through to the IR receiver or IR imager. The IR processing system 104 can also include one or more proximity sensors 120 that detect the proximity of a user to the mobile device. Although shown as a component of the IR processing system 104 in this example, the IR imaging system 106 may be implemented in the mobile device 100 separate from the IR processing system.

The multi-wavelength IR LED 102 can be implemented as a single LED, or as a combination of LEDs packaged together as a single component in the mobile device, and is designed to conserve PCB and packaging space in a mobile device. In implementations, the multi-wavelength IR LED 102 is designed to project the NIR light 108 in multiple wavelengths, such as wavelengths that encompass approximately 790 nm to 860 nm (nanometers), or higher. For example, the multi-wavelength IR LED can project the NIR light at a wavelength of approximately 810 nm to illuminate an eye (or both eyes) of a person, the NIR light is reflected from the eye or eyes of the person, and the NIR filtering system 110 filters the NIR light to pass the 810 nm wavelength of the reflected NIR light 112 (shown at 122) to capture an image 124 of a pupil of the eye with the IR imager 114. The captured image 124 of the pupil (or pupils) can then be analyzed for iris authentication with an iris authentication application 126 implemented by the mobile device.

Additionally, the multi-wavelength IR LED 102 can project the NIR light 108 at a wavelength of approximately 830 nm that illuminates and is reflected from a person, and the NIR filtering system 110 filters the NIR light to pass the 830 nm wavelength of the reflected NIR light 112 (shown at 128) for proximity sensing by the proximity sensors 120 to detect the proximity of the person to the mobile device. Further, the multi-wavelength IR LED 102 can project the NIR light 108 at a wavelength of approximately 850 nm that illuminates and is reflected from the person, and the NIR filtering system 110 filters the NIR light to pass the 850 nm wavelength of the reflected NIR light 112 (shown at 130) for gesture recognition 132 of a gesture with the IR receiver diode 116. The gesture recognition 132 can be determined by an imaging application 134 that is implemented by the mobile device to detect a gesture from the person as an input to the mobile device.

A gesture can be recognized using the IR processing system in conjunction with the imaging application 134 via two techniques, such as with a system of IR light receivers (e.g., three or four) used to detect gestures that include a user waving a hand over the mobile device, or towards the device and then away. Alternatively, a gesture can be determined with the IR imager 114, such as to detect a more complex gesture that may include hand and fingers opening or closing. Generally, IR receivers (e.g., the IR receiver diode 116) consume substantially less power, and can be used to detect the larger-motion gestures, whereas the IR imager 114 can be utilized for the more complex gesture detection. The multi-wavelength IR LED 102 can also project the NIR light 108 at one or more additional wavelengths for various IR-based features implemented by the mobile device, and the NIR filtering system 110 filters the reflected NIR light at the additional wavelengths of the NIR light to block undesired wavelengths for a specific IR-based feature.

The iris authentication application 126 and the imaging application 134 can each be implemented as a software application or module, such as computer-executable software instructions that are executable with a processing system of the device in embodiments of a multi-wavelength infra-red LED. The iris authentication application 126 and the imaging application 134 can be stored on computer-readable storage memory (e.g., a memory device), such as any suitable memory device or electronic data storage implemented in the mobile device. Although shown as separate components, the iris authentication application 126 and/or the imaging application 134 may be implemented as components of the IR processing system 104.

Additionally, the mobile device 100 can be implemented with various components, such as a processing system and memory, an integrated display device 136, and any number and combination of various components as further described with reference to the example device shown in FIG. 5. In this example, the mobile device 100 also includes a camera device 138 that is utilized to capture digital images, and the camera device 138 includes an imager 140 to capture a visible light digital image of a subject, such as a user (or part of the user) of the mobile device. In alternate implementations, the IR imager 114 of the IR processing system 104 and the camera imager 140 can be combined as a single imager of the mobile device 100 in a design that may be dependent on IR filtering, imaging algorithm processing, and/or other parameters. The camera device 138 also includes a light 142, such as a flash or LED, that emits visible light to illuminate the subject for imaging. The camera device 138 can be integrated with the mobile device 100 as a front-facing camera with a lens 144 that is integrated in the housing of the mobile device and positioned to face the user when holding the device, such as to view the display screen of the display device 136.

Figure 2:
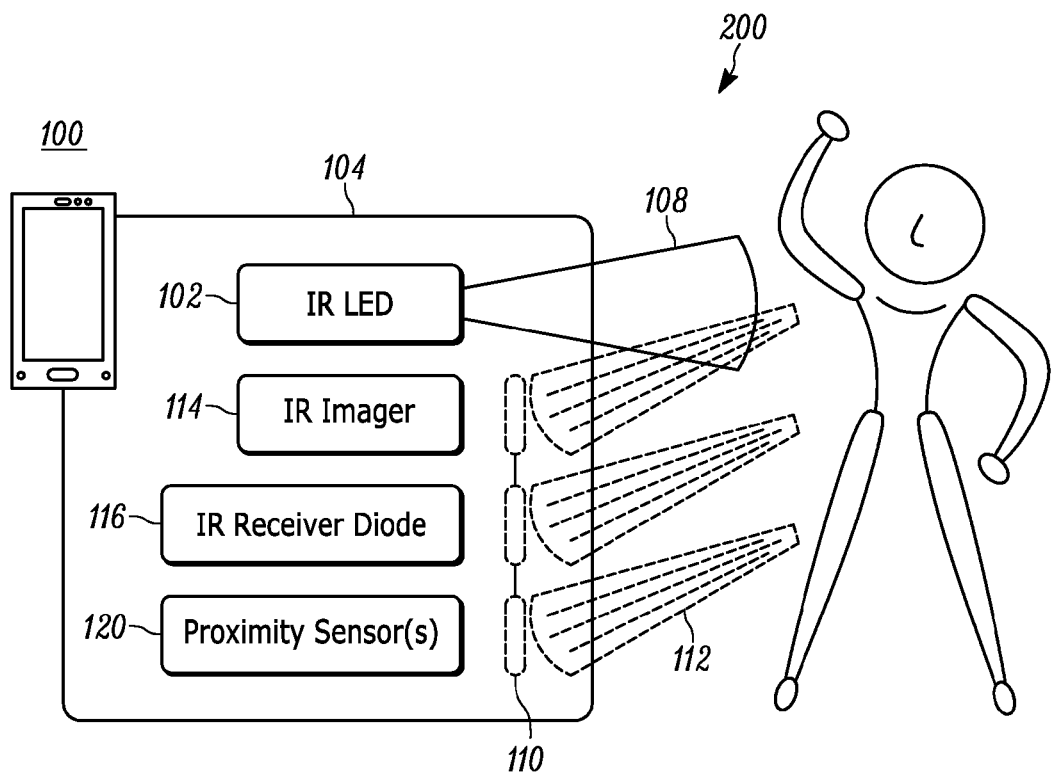
FIG. 2 further illustrates examples of a multi-wavelength infra-red LED in accordance with one or more embodiments.

FIG. 2 illustrates an example 200 of a multi-wavelength infra-red LED utilized in the mobile device 100 as described herein. As shown in the example, the IR processing system 104 of the mobile device 100 includes the multi-wavelength IR LED 102 and the NIR filtering system 110. The IR processing system 104 also includes the IR imager 114, the IR receiver diode 116, and optionally, the proximity sensors 120. As described above, the multi-wavelength IR LED 102 is implemented to project the NIR light 108 in multiple wavelengths, such as wavelengths that encompass approximately 790 nm to 860 nm (nanometers), or higher. The NIR filtering system 110 is implemented to receive the reflected 112 NIR light and filter the NIR light to pass one of the multiple wavelengths for each of the different IR-based features of the mobile device. In this example 200, the user of the mobile device 100 may be holding the device, such as for iris authentication or gesture input detection, or the device may be sitting on furniture and activated for proximity sensing as the user approaches the device, or also for gesture input detection.

In implementations, the multi-wavelength IR LED can project the NIR light 108 at a wavelength of approximately 810 nm to illuminate an eye (or both eyes) of the person, and the NIR filtering system 110 filters the NIR light to pass the 810 nm wavelength of the reflected NIR light 112 to capture an image of a pupil of the eye with the IR imager 114. Additionally, the multi-wavelength IR LED 102 can project the NIR light 108 at a wavelength of approximately 830 nm that illuminates and is reflected from a person, and the NIR filtering system 110 filters the NIR light to pass the 830 nm wavelength of the reflected 112 NIR light for proximity sensing by the proximity sensors 120 to detect the proximity of the person to the mobile device. Further, the multi-wavelength IR LED 102 can project the NIR light 108 at a wavelength of approximately 850 nm that illuminates and is reflected from the person, and the NIR filtering system 110 filters the NIR light to pass the 850 nm wavelength of the reflected 112 NIR light for gesture recognition 132 of a gesture with the IR receiver diode 116 and to detect a gesture input to the mobile device from the person.

Example methods 300 and 400 are described with reference to respective FIGS. 3 and 4 in accordance with implementations of multi-wavelength infra-red LED. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
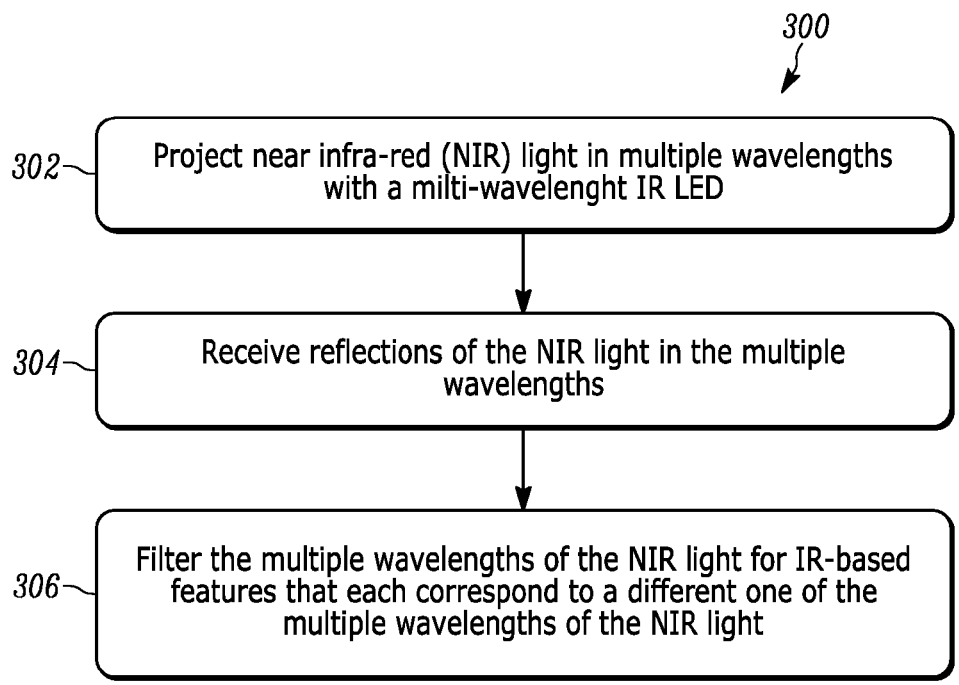
FIG. 3 illustrates example method(s) of a multi-wavelength infra-red LED in accordance with one or more embodiments.

FIG. 3 illustrates example method(s) 300 of multi-wavelength infra-red LED implementations. The order in which the method is described is not intended to be construed as a limitation, and any number or combination of the described method operations can be performed in any order to perform a method, or an alternate method.

At 302, near infra-red (NIR) light is projected in multiple wavelengths with a multi-wavelength IR LED. For example, the multi-wavelength IR LED 102 implemented in the mobile device 100 projects the NIR light 108 in multiple wavelengths, such as in wavelengths that encompass approximately 790 nm to 860 nm (nanometers). The multi-wavelength IR LED 102 projects the NIR light 108 at a wavelength of approximately 810 nm to illuminate an eye (or both eyes) of a person, and the reflected NIR light is captured as an image of a pupil of the eye with the IR imager 114 for iris authentication by the iris authentication application 126. Additionally, the multi-wavelength IR LED 102 projects the NIR light 108 at a wavelength of approximately 830 nm that illuminates and is reflected from the person, and the reflected NIR light is detected for proximity sensing to detect the proximity of the person to the mobile device. Further, the multi-wavelength IR LED 102 projects the NIR light 108 at a wavelength of approximately 850 nm that illuminates and is reflected from the person, and the reflected NIR light is detected as a gesture input to the mobile device. The multi-wavelength IR LED 102 can also project the NIR light 108 at one or more additional wavelengths for various IR-based features implemented by the mobile device.

At 304, reflections of the NIR light is received in the multiple wavelengths and, at 306, the multiple wavelengths of the NIR light is filtered for IR-based features that each correspond to a different one of the multiple wavelengths of the NIR light. For example, the NIR filtering system 110 implemented in the mobile device 100 receives reflections of the NIR light and filters the NIR light to pass one of the multiple wavelengths for each of the different IR-based features of the mobile device that each correspond to a different one of the multiple wavelengths of the NIR light. The NIR filtering system 110 receives and filters the reflected NIR light to pass the 810 nm wavelength of the reflected NIR light to capture an image of a pupil of the eye (or both eyes of the person) with the IR imager 114 for iris authentication by the iris authentication application 126. The NIR filtering system 110 also receives and filters the reflected NIR light to pass the 830 nm wavelength of the reflected NIR light for proximity sensing to detect the proximity of the person to the mobile device. The NIR filtering system 110 also receives and filters the reflected NIR light to pass the 850 nm wavelength of the reflected NIR light to detect a gesture from the person as an input to the mobile device. Additionally, the NIR filtering system 110 can receive and filter the reflected NIR light at the additional wavelengths of the light to block undesired wavelengths for a specific IR-based feature of the mobile device.

Figure 4:
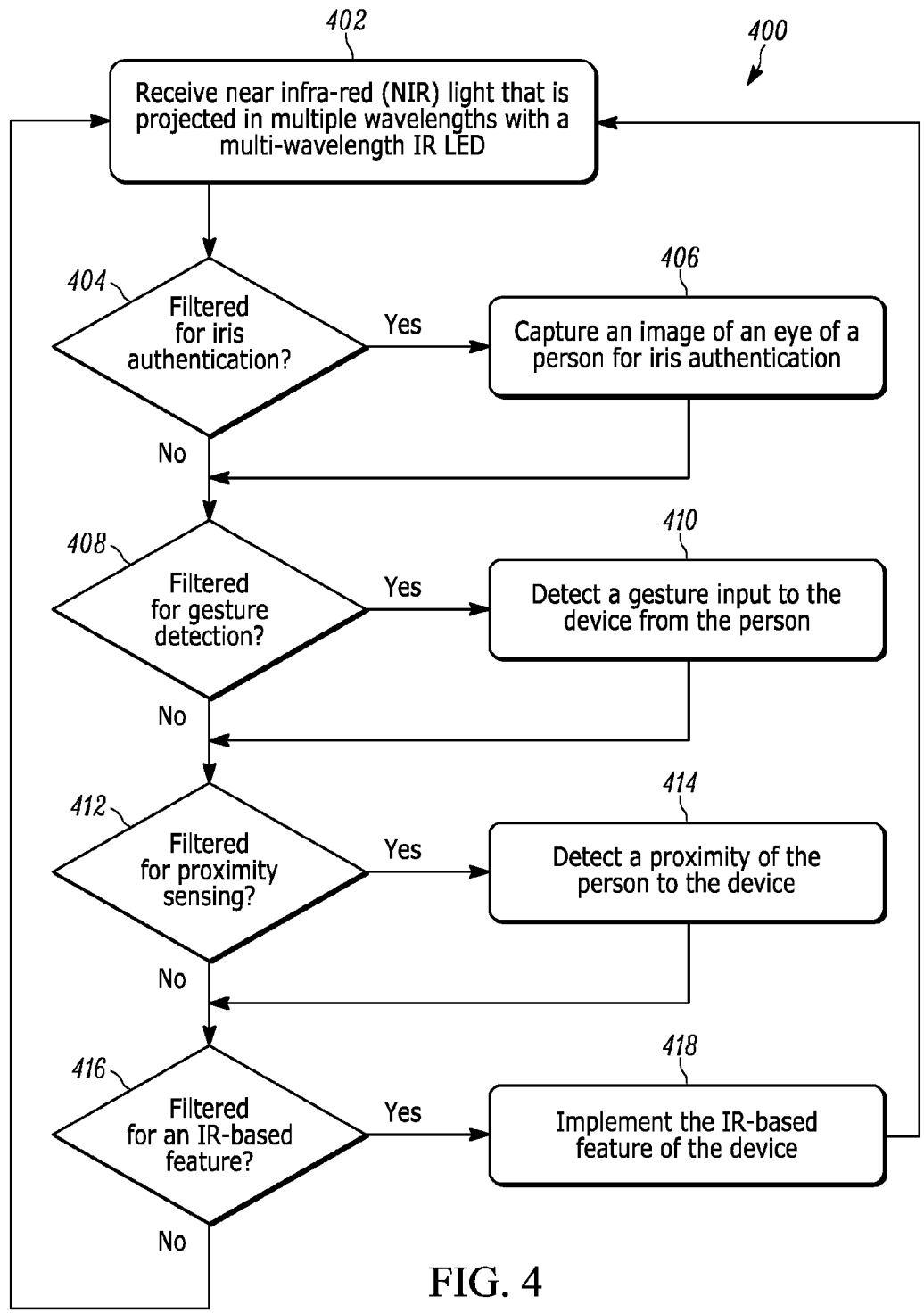
FIG. 4 illustrates example method(s) of a multi-wavelength infra-red LED in accordance with one or more embodiments.

FIG. 4 illustrates example method(s) 400 of multi-wavelength infra-red LED implementations. The order in which the method is described is not intended to be construed as a limitation, and any number or combination of the described method operations can be performed in any order to perform a method, or an alternate method.

At 402, near infra-red (NIR) light that is projected in multiple wavelengths with a multi-wavelength IR LED is received. For example, the NIR filtering system 110 implemented in the mobile device 100 receives the NIR light 108 (e.g., as reflections) that is projected by the multi-wavelength IR LED 102 in multiple wavelengths, such as in wavelengths that encompass 790 nm to 860 nm (nanometers).

At 404, a determination is made, based on the mode of the device, as to whether the system processes the NIR light that is reflected from an illumination of a pupil of an eye, and filtered for iris authentication. For example, the NIR filtering system 110 filters the reflected NIR light to pass the 810 nm wavelength of the reflected NIR light 112 to capture the image 124 of a pupil of the eye with the IR imager 114. All of the IR receivers and IR imagers of the device will receive the reflected NIR light, and the responsive action of the mobile device can then be selected contextually. For example, if user is unlocking the device (e.g., a mobile phone), then the device mode would be authentication. Alternatively, if a gesture is expected to be received, then the device mode would respond to the gesture. The device itself can contextually determine the action to take so that the corresponding NIR light receiving components receive the associated NIR reflected wavelength for the optimum function of both the device component and user experience.

If the device mode indicates that the reflected NIR light is to be filtered and processed for iris authentication (i.e., "Yes" from 404), then at 406, the image 124 of a pupil of the eye of the person is captured with the IR imager 114, and the captured image 124 is then analyzed for iris authentication by the iris authentication application 126 implemented by the mobile device.

If the NIR light is not filtered and processed for iris authentication (i.e., "No" from 404), or continuing from 406, a determination is made at 408, based on the mode of the device, as to whether the system filters and processes the NIR light that is reflected from a person and filtered for detection of a gesture input to the mobile device. For example, the NIR filtering system 110 filters the reflected NIR light to pass the 850 nm wavelength of the reflected NIR light 112 for gesture recognition 132 of a gesture with the IR receiver diode 116. If the device mode indicates that the reflected NIR light is to be filtered and processed for gesture detection (i.e., "Yes" from 408), then at 410, the gesture recognition 132 can be determined by the imaging application 134 to detect a gesture from the person as an input to the mobile device.

If the NIR light is not filtered and processed for gesture detection (i.e., "No" from 408), or continuing from 410, a determination is made at 412, based on the mode of the device, as to whether the system filters and processes the NIR light that is reflected from a person and filtered for proximity sensing. For example, the NIR filtering system 110 filters the reflected NIR light to pass the 830 nm wavelength of the reflected NIR light 112 for proximity sensing by the proximity sensors 120 to detect the proximity of the person to the mobile device. If the device mode indicates that the reflected NIR light is to be filtered and processed for proximity sensing (i.e., "Yes" from 412), then at 414, a proximity of the person to the device is detected based on the proximity sensors 120.

If the NIR light is not filtered and processed for proximity sensing (i.e., "No" from 412), or continuing from 414, a determination is made at 416, based on the mode of the device, as to whether the system filters and processes the NIR light that is filtered for any other IR-based features of the device. For example, the NIR filtering system 110 filters and processes the reflected NIR light at one or more additional wavelengths of the NIR light to block undesired wavelengths for a specific IR-based feature of the mobile device. If the device mode indicates that the reflected NIR light is to be filtered and processed for any other IR-based features of the mobile device (i.e., "Yes" from 416), then at 418, the IR-based feature of the mobile device is implemented based on the filtered NIR light. If the NIR light is not filtered and processed for an IR-based feature of the device (i.e., "No" from 416), or continuing from 418, then the method continues at 402 to receive the near infra-red (NIR) light that is projected in the multiple wavelengths from the multi-wavelength IR LED.

Figure 5:
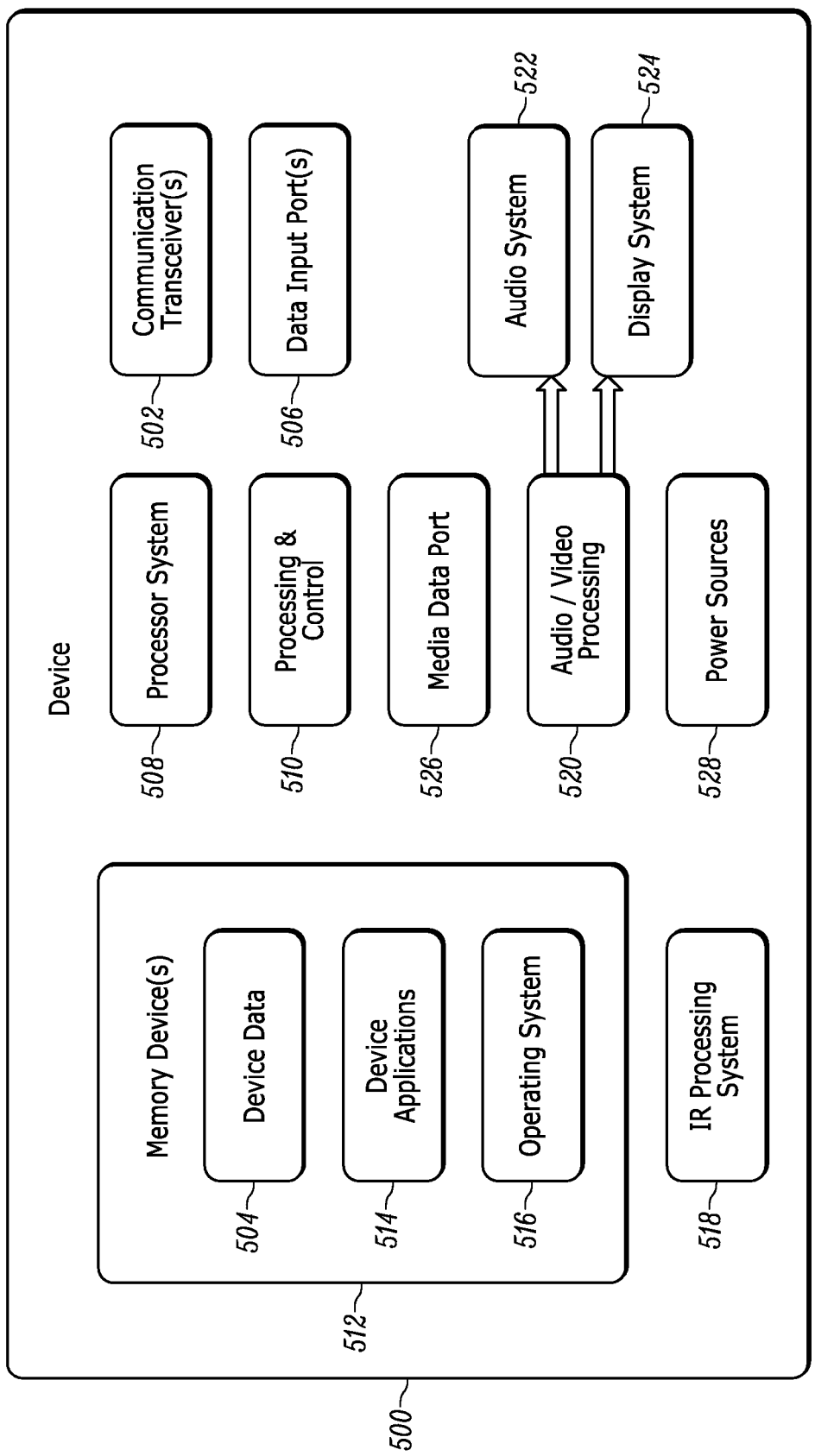
FIG. 5 illustrates various components of an example device that can implement embodiments of a multi-wavelength infra-red LED.

FIG. 5 illustrates various components of an example device 500 in which embodiments of a multi-wavelength infra-red LED can be implemented. The example device 500 can be implemented as any of the computing devices described with reference to the previous FIGS. 1-4, such as any type of client device, mobile phone, tablet, computing, communication, entertainment, gaming, media playback, and/or other type of device. For example, the mobile device 100 shown in FIG. 1 may be implemented as the example device 500.

The device 500 includes communication transceivers 502 that enable wired and/or wireless communication of device data 504 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on. In this example, the device 500 includes an IR processing system 518 that implements embodiments of a multi-wavelength infra-red LED, and may be implemented with hardware components and/or in software, such as when the device 500 is implemented as the mobile device 100 described with reference to FIGS. 1-4. An example of the IR processing system 518 is the IR processing system 104, which also optionally includes the iris authentication application 126 and/or the imaging application 134, that is implemented by the mobile device 100.

The device 500 also includes an audio and/or video processing system 520 that generates audio data for an audio system 522 and/or generates display data for a display system 524. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 526. In implementations, the audio system and/or the display system are integrated components of the example device. Alternatively, the audio system and/or the display system are external, peripheral components to the example device.

The device 500 can also include one or more power sources 528, such as when the device is implemented as a mobile device. The power sources may include a charging and/or power system, and can be implemented as a flexible strip battery, a rechargeable battery, a charged super-capacitor, and/or any other type of active or passive power source.

Although embodiments of a multi-wavelength infra-red LED have been described in language specific to features and/or methods, the subject of the appended claims is not necessarily limited to the specific features or methods described. Rather, the specific features and methods are disclosed as example implementations of a multi-wavelength infra-red LED, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for utilizing a multi-wavelength infra-red (IR) LED, comprising:
projecting near infra-red (NIR) light in multiple wavelengths with the multi wavelength IR LED, including at least a wavelength that is reflected from a person;
receiving reflections of the NIR light in the multiple wavelengths; and
filtering the multiple wavelengths of the NIR light for IR-based features that each correspond to a different one of the multiple wavelengths of the NIR light, said filtering including the NIR light filtered for proximity sensing to detect a proximity of the person.

2. The method as recited in claim 1, wherein the multi-wavelength IR LED comprises a combination of LEDs packaged together as a single component for implementation in a mobile device.

3. The method as recited in claim 1, wherein the NIR light is projected in the multiple wavelengths that encompass approximately 790 nm to 860 nm (nanometers).

4. The method as recited in claim 1, wherein the NIR light is projected to include at least an additional wavelength that illuminates an eye of the person, the NIR light reflected and filtered to capture an image of a pupil of the eye with an IR imager for iris authentication.

5. The method as recited in claim 1, wherein the NIR light is said filtered for the proximity sensing to detect the proximity of the person to a mobile device.

6. The method as recited in claim 1, wherein the NIR light is projected to include at least an additional wavelength that is reflected from the person and the NIR light is filtered to detect a gesture as an input to a mobile device.

7. The method as recited in claim 1, wherein the NIR light is projected in the multiple wavelengths and reflected from the person for at least one of:
illumination of an eye of the person and said filtering the reflected NIR light to capture an image of a pupil of the eye with an IR imager for iris authentication; and
said filtering the reflected NIR light to detect a gesture from the person as an input to a mobile device.

8. A mobile device, comprising:
a multi-wavelength infra-red (IR) LED configured to project near infra-red (NIR) light in multiple wavelengths, including the NIR light projected for reflection from a person;
IR-based features that each correspond to a different one of the multiple wavelengths of the NIR light; and
a NIR filtering system configured to receive reflections of the NIR light and filter the multiple wavelengths of the NIR light for each of the IR-based features of the mobile device, including the NIR light filtered to detect a gesture as an input to the mobile device.

9. The mobile device as recited in claim 8, wherein the multi-wavelength IR LED comprises a combination of LEDs packaged together as a single component for implementation in the mobile device.

10. The mobile device as recited in claim 8, wherein the multi-wavelength IR LED is configured to project the NIR light in the multiple wavelengths that encompass approximately 790 nm to 860 nm (nanometers).

11. The mobile device as recited in claim 8, wherein the multi-wavelength IR LED is configured to project the NIR light to illuminate an eye of the person, the NIR light reflected and the NIR filtering system configured to filter the NIR light to capture an image of a pupil of the eye with an IR imager for iris authentication.

12. The mobile device as recited in claim 8, wherein the multi-wavelength IR LED is configured to project the NIR light that is reflected from the person, and the NIR filtering system configured to filter the NIR light for proximity sensing to detect the proximity of the person to the mobile device.

13. The mobile device as recited in claim 8, wherein the multi-wavelength IR LED is configured to project the NIR light in at least one of the multiple wavelengths that is reflected from the person.

14. The mobile device as recited in claim 8, wherein the multi-wavelength IR LED is configured to project the NIR light in the multiple wavelengths, the NIR light reflected from the person and the NIR filtering system configured to at least one of:
filter the reflected NIR light to pass a first wavelength to capture an image of a pupil of an eye of the person with an IR imager for iris authentication;
filter the reflected NIR light to pass a second wavelength for proximity sensing to detect a proximity of the person to the mobile device; and
filter the reflected NIR light to pass a third wavelength to detect the gesture from the person as the input to the mobile device.

15. The mobile device as recited in claim 8, wherein the NIR light is reflected from the person and the NIR filtering system is configured to at least one of:
filter the reflected NIR light to pass a first wavelength based on a mode of the mobile device to capture an image of a pupil of an eye of the person with an IR imager for iris authentication;
filter the reflected NIR light to pass a second wavelength based on the mode of the mobile device for proximity sensing to detect a proximity of the person to the mobile device; and
filter the reflected NIR light to pass a third wavelength based on the mode of the mobile device to detect the gesture from the person as the input to the mobile device.

16. A system, comprising:
a multi-wavelength infra-red (IR) LED configured to project near infra-red (NIR) light in multiple wavelengths, including a first wavelength that illuminates an eye of a person;
a NIR filtering system configured to receive reflections of the NIR light and filter the multiple wavelengths of the NIR light for each of different IR-based features, including the first wavelength of the NIR light filtered for iris authentication; and a memory and processing system to implement an imaging application that is configured to process captured images of the reflected NIR light for one or more of the different IR-based features.

17. The system as recited in claim 16, wherein the multi-wavelength IR LED is configured to project the NIR light in the multiple wavelengths that encompass approximately 790 nm to 860 nm for the different IR-based features.

18. The system as recited in claim 16, wherein the multi-wavelength IR LED is configured to project the NIR light in the multiple wavelengths comprising:

a second wavelength that illuminates at least part of the person and the NIR light is filtered to detect a proximity of the person; and a third wavelength that illuminates at least part of the person and the NIR light is filtered to detect a gesture as a device input.

19. The system as recited in claim 16, wherein the multi-wavelength IR LED is configured to project the NIR light in the multiple wavelengths, the NIR light reflected from the person and the NIR filtering system configured to at least one of:

filter the reflected NIR light to pass the first wavelength to capture an image of a pupil of the eye of the person with an IR imager for the iris authentication;

filter the reflected NIR light to pass a second wavelength for proximity sensing to detect a proximity of the person; and filter the reflected NIR light to pass a third wavelength to detect a gesture from the person as a device input.

20. The system as recited in claim 16, wherein the multi-wavelength IR LED is configured to project the NIR light in the multiple wavelengths, the NIR light reflected from the person and the NIR filtering system configured to at least one of:

filter the reflected NIR light to pass the first wavelength based on a mode of a device to capture an image of a pupil of the eye of the person with an IR imager for the iris authentication;

filter the reflected NIR light to pass a second wavelength based on the mode of the device for proximity sensing to detect a proximity of the person; and filter the reflected NIR light to pass a third wavelength based on the mode of the device to detect a gesture from the person as a device input.

* * * * *